United States Patent
Shorman et al.

(10) Patent No.: US 10,366,090 B2
(45) Date of Patent: Jul. 30, 2019

(54) DISPLAYING TEMPORARY PROFILE CONTENT ITEMS ON COMMUNICATION NETWORKS

(71) Applicant: Facebook, Inc., Menlo Park, CA (US)

(72) Inventors: Aigerim Shorman, San Francisco, CA (US); Ben Chen, San Jose, CA (US); Jeremy Samuel Friedland, San Francisco, CA (US); Alan Thomas Clark, San Francisco, CA (US); Ryan Michael Houx, Menlo Park, CA (US); Xiao Yang Xie, Foster City, CA (US); Xiaoyi Zhang, Redwood City, CA (US); Rahul Rajagopalan, Mountain View, CA (US); Adam Ankenmann, Mountain View, CA (US); Mitchell Sadao Fukumoto, Santa Clara, CA (US); Noah Bradley Blecher, San Francisco, CA (US); Adam Shih, San Francisco, CA (US); Jing Chen, Mountain View, CA (US); David Martin Kaye, Redwood City, CA (US); Crystal Rhan-Tsor Chen, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 283 days.

(21) Appl. No.: 15/085,841

(22) Filed: Mar. 30, 2016

(65) Prior Publication Data
US 2017/0286423 A1 Oct. 5, 2017

(51) Int. Cl.
*G06F 16/2457* (2019.01)
*G06Q 50/00* (2012.01)
(Continued)

(52) U.S. Cl.
CPC ...... *G06F 16/24578* (2019.01); *G06F 16/248* (2019.01); *G06F 16/9535* (2019.01); *G06Q 50/01* (2013.01)

(58) Field of Classification Search
CPC ......... G06F 17/30864; G06F 17/30867; G06F 17/30017; G06F 17/30038;
(Continued)

(56) References Cited

U.S. PATENT DOCUMENTS 7,230,628 B1 * 6/2007 Haeberli ............... G06Q 30/06
345/582
9,477,758 B1 * 10/2016 Tong ............... G06F 17/30864
(Continued)

OTHER PUBLICATIONS

Kristi Hines. "How to Create a Snapchat Geofilter for Your Event". Published Feb. 15, 2016. "https://www.socialmediaexaminer.com/how-to-create-a-snapchat-geofilter-for-your-event/". Accessed Sep. 29, 2018. (Year: 2016).*
(Continued)

*Primary Examiner* — Michael Pham
(74) *Attorney, Agent, or Firm* — Baker Botts L.L.P.

(57) ABSTRACT

In one embodiment, a method includes accessing, from a data store of the communication network, user information associated with a first user of the communication network, identifying one or more entities associated with the communication network that are relevant to the first user based on the user information, and retrieving, for each identified entity, one or more content frames associated with the entity. The method includes ranking the one or more content frames based on the user information. The method also includes sending, to a client device of the first user, one or more of the content frames for display to the first user in ranked order, wherein each content frame is selectable by the first user to display the selected content frame in association with a particular content item for a specified period of time.

16 Claims, 19 Drawing Sheets

(51) Int. Cl.
*G06F 16/9535* (2019.01)
*G06F 16/248* (2019.01)

(58) Field of Classification Search
CPC ......... G06F 17/30265; G06F 16/24578; G06F 16/9535; G06F 16/248; G06F 16/168; G06F 16/173; G06F 16/25; G06Q 50/01
USPC ........................................................ 707/725
See application file for complete search history.

(56) References Cited

U.S. PATENT DOCUMENTS

| | | | | |
|---|---|---|---|---|
| 2012/0158751 | A1* | 6/2012 | Tseng | G06Q 30/02 707/751 |
| 2012/0166964 | A1* | 6/2012 | Tseng | G06F 3/048 715/745 |
| 2014/0123228 | A1* | 5/2014 | Brill | H04L 63/1416 726/4 |
| 2014/0244752 | A1* | 8/2014 | Tseng | H04L 51/32 709/204 |
| 2014/0245352 | A1* | 8/2014 | Tseng | H04L 51/32 725/40 |
| 2015/0242679 | A1* | 8/2015 | Naveh | H04N 21/262 382/100 |

OTHER PUBLICATIONS

Gary Vaynerchuck. "How to Create and Use Snapchat's New Custom GeoFilters". Published 3 years prior to access date. "https://www.garyvaynerchuk.com/how-to-create-and-use-snapchats-new-custom-geofilters/". Accessed Sep. 28, 2018 (Year: 2015).*

Cohen, David. "Facebook Tests College Football Frames for Profile Pictures". Oct. 9, 2015. https://www.adweek.com/digital/college-football-custom-frames-fprofilepictures/. pp. 1-7. (Year: 2015).*

* cited by examiner

DISPLAYING TEMPORARY PROFILE CONTENT ITEMS ON COMMUNICATION NETWORKS

TECHNICAL FIELD

This disclosure generally relates to managing profile content items on a communication network such as an online social network.

BACKGROUND

A communication system, which may include a website, may enable its users (such as persons or organizations) to interact with it and with each other through it. The communication system may comprise, for example, a social-networking system, other suitable communication systems, or any combination thereof. The website may comprise a social-networking website, other suitable website, or any combination thereof. The communication system may, with input from a user, create and store in the communication system a user profile associated with the user. The user profile may include demographic information, communication-channel information, and information on personal interests of the user. The communication system may also, with input from a user, create and store a record of relationships of the user with other users of the communication system, as well as provide services (e.g. wall posts, photo-sharing, event organization, messaging, games, or advertisements) to facilitate social interaction between or among users.

The communication system may send over one or more networks content or messages related to its services to a mobile or other computing device of a user. A user may also install software applications on a mobile or other computing device of the user for accessing a user profile of the user and other data within the communication system. The communication system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, a communication system (e.g., a social-networking system) may access, from a data store of the communication network, user information associated with a first user of the communication network, identify one or more entities associated with the communication network that are relevant to the first user based on the user information, and retrieve, for each identified entity, one or more content frames associated with the entity. Each content frame may be configured to be displayed in association with a particular content item associated with the first user. The communication system may then rank the one or more content frames based on the user information. Then, the communication system may send, to a client device of the first user, one or more of the content frames for display to the first user in ranked order. Each content frame may be selectable by the first user to display the selected content frame in association with a particular content item for a specified period of time. After the selected content frame is displayed in association with the particular content item for the specified period of time, the selected content frame may revert back to a previously-displayed content frame or a default content frame.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
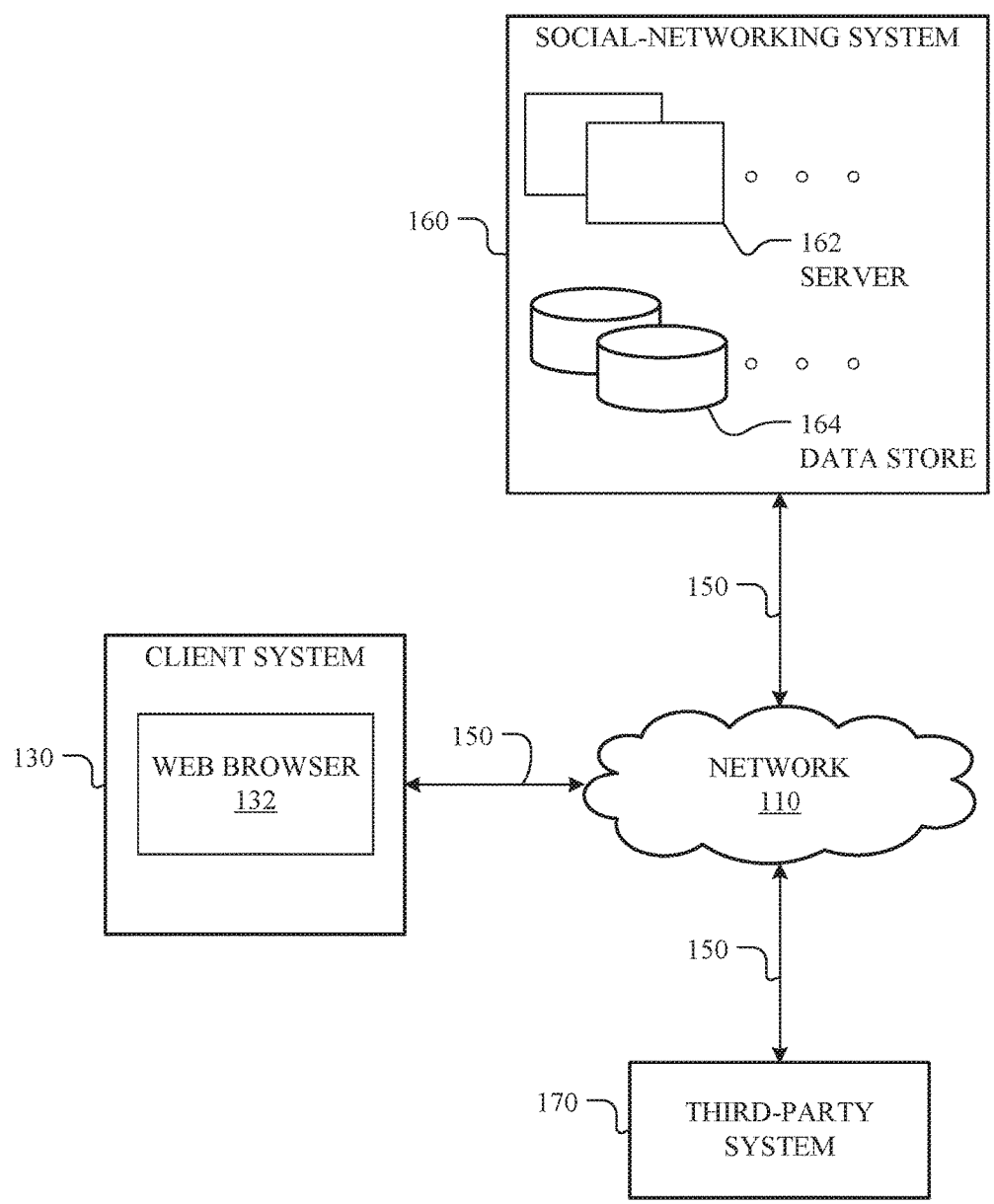
FIG. 1 illustrates an example network environment associated with a communication system.

FIG. 1 illustrates an example network environment 100 associated with a communication system. The communication system may comprise, for example, a social-networking system, a messenger system, other suitable communication systems, or any combination thereof. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host a communication network (e.g., an online social network, a messenger network, other suitable communication networks, or any combination thereof). Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
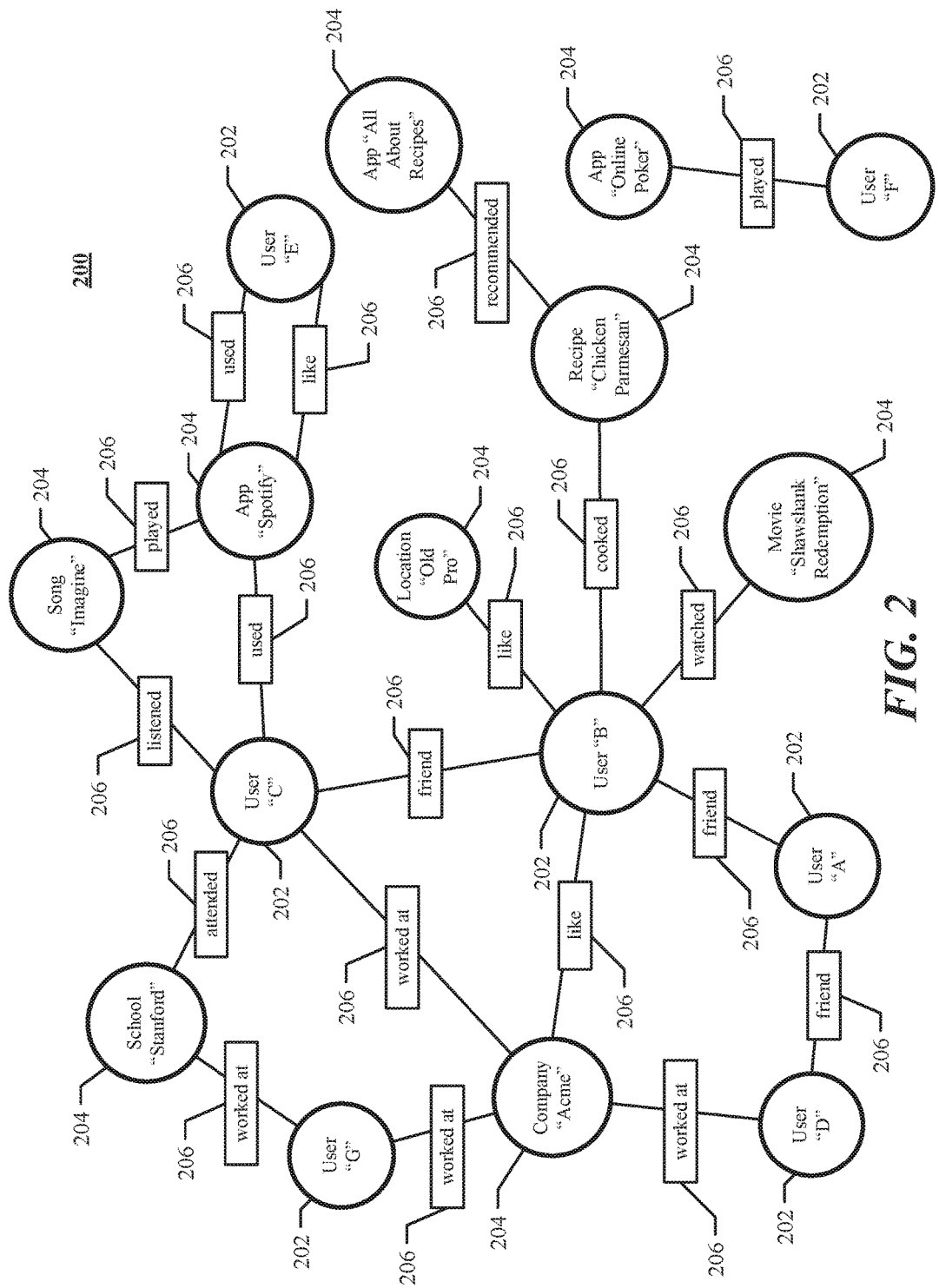
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Mobile Client System

Figure 3:
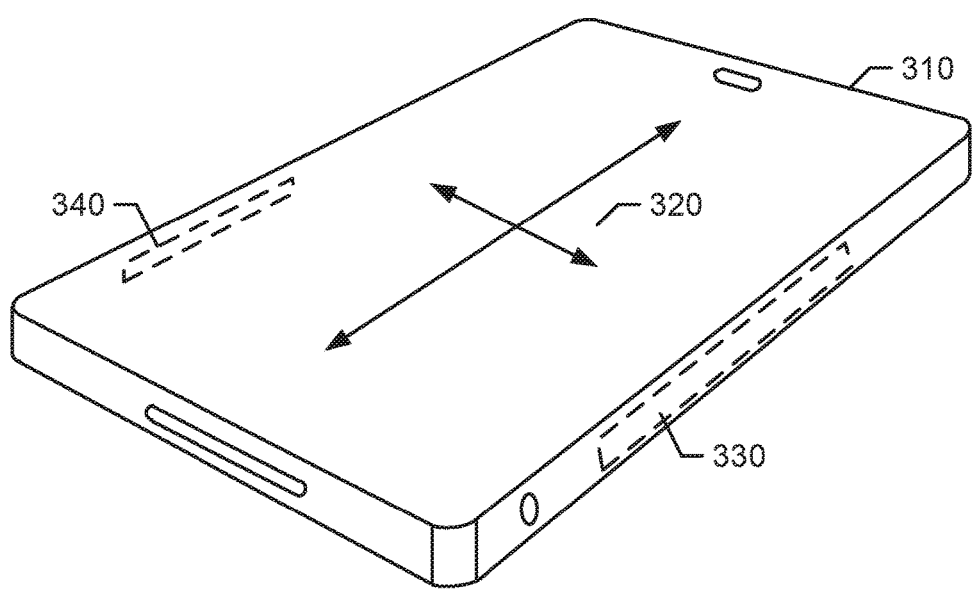
FIG. 3 illustrates an example mobile client system 130.

FIG. 3 illustrates an example mobile client system 130. This disclosure contemplates mobile client system 130 taking any suitable physical form. In particular embodiments, mobile client system 130 may be a computing system as described below. As example and not by way of limitation, mobile client system 130 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile client system 130 may have a display screen 310 and a touch sensor 320 as an input component. In the example of FIG. 3, touch sensor 320 is incorporated on a front surface (e.g., display screen 310) of mobile client system 130. Touch sensor 320 may detect the presence and location of a touch (e.g., from a finger of a user) or the proximity of an object (e.g., a stylus). In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In particular embodiments, a user may be presented with a user interface ("UP") of one or more applications (e.g., mobile applications) on screen display 310 of mobile client system 130, and the user may interact with the UI of each of the applications via touch sensor 320.

In the example of FIG. 3, one or more antennae 330, 340 may be incorporated into one or more sides of mobile client system 130. Antennae 330, 340 are components that convert electric current into radio waves, and vice versa. During transmission of signals, a transmitter applies an oscillating radio frequency (RF) electric current to terminals of antenna 330, 340, and antenna 330, 340 radiates the energy of the applied the current as electromagnetic (EM) waves. During reception of signals, antennae 330, 340 convert the power of an incoming EM wave into a voltage at the terminals of antennae 330, 340. The voltage may be transmitted to a receiver for amplification.

In particular embodiments, mobile client system 130 many include a communication component coupled to antennae 330, 340 for communicating with an Ethernet or other wire-based network or a wireless NIC (WNIC), wireless adapter for communicating with a wireless network, such as for example a WI-FI network or modem for communicating with a cellular network, such third generation mobile telecommunications (3G), or Long Term Evolution (LTE) network. This disclosure contemplates any suitable network and any suitable communication component for it. As an example and not by way of limitation, mobile client system 130 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, mobile client system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Mobile client system 130 may include any suitable communication component for any of these networks, where appropriate.

In particular embodiments, the communication component coupled to antennae 330, 340 of mobile client system 130 may be configured to determine location data based on global positioning system (GPS) signals, cellular triangulation, wireless hotspots, or any suitable methods for determining location data. In particular embodiments, the location service of mobile client system 130 may use one or more methods of location determination, such as for example, using the location of one or more cellular towers, crowd-sourced location information associated with a WI-FI hotspot, or a GPS function of mobile client system 130. As an example and not by way of limitation, the application may use GPS data as the primary source of location information depending at least in part on whether mobile client system 130 is able to acquire GPS data within a pre-determined period of time. As another example, if mobile client system 130 is unable to acquire the GPS data within the pre-determined sampling duration, the application may use the location determined using one or more cellular towers or WI-FI hotspots. Although this disclosure describes a location service using particular methods of location determination, this disclosure contemplates a location service using any suitable method or combination of methods of location detection.

Temporary Profile Pictures

In particular embodiments, a communication system may customize profile content items associated with a profile of a user (e.g., profile pictures, frames and/or other content items overlapping a portion of profile pictures, videos, audio files, holograms, virtual reality spaces, etc.) themselves or with suggested frames and set these customized content items as temporary profile items for a set amount of time. In particular embodiments, the communication system may include social-networking system 160. As described in more detail below, the method for setting a temporary profile item may include a user going to their profile page, selecting to change one or more of her profile content items to one or more different and/or modified profile content items based on various customizable features, and then selecting an expiration time for the newly-selected temporary profile content items to revert back to the previous profile content items or to a previously-set default profile content item. Then, after the temporary profile content items expire (e.g., after the expiration time), the communication system reverts the profile picture back to the previous profile content items or to a previously-set default profile content item. In addition, the communication system may save the temporary profile content items to the user's profile-content album. Alternatively, temporary profile content items may be suggested to the user based on relevant events associated with a social-networking entity (e.g., user, concept, or other entity associated with the communication network, which may be represented by a particular node on a social graph 200 of the online social network, discussed below), and a call-to-action button and/or link may be presented for the user to click through to go to the social-networking entity to select a profile content item. As discussed below, the suggestions may be determined by the communication system based on social signals associated with the user, which includes the user's interactions with content on the communication system (e.g., through the first user's views, likes, posts, reshares, etc.), in addition to other information collected from the social graph 200 (e.g., identifications of entities connected to the user or other social-graph information).

Generally, when a user selects to customize content items associated with the user's profile, these changes are permanent (e.g., the changes to the content items remain in place until the user chooses to make additional customizations). On the other hand, the methods and the systems of this application are directed to customizing content items associated with a profile of a user, and then allowing for the selection of a time period such that the content items are displayed with the profile of the user for a temporary period of time before reverting back to a previously selected content item or to a default content item. An advantage of this application is to make it easier for users to set up one or more temporary profile content items for a set amount of time for a particular date, event, and/or other reasons. After the set amount of time, the one or more temporary profile content items may revert back automatically to a previous profile item or default profile item, which may help alleviate some of the social pressures of using date-specific and/or event-specific content items that are changed after they lose their social relevance, in addition to helping the user manage the timing and relevancy of content items displayed on her profile. As will be discussed in detail below, the selection of the one or more temporary profile content items may include various customization features such as the addition of content frames, text, doodles, stickers, etc., which may be recommended to the user based on a variety of factors. Although this disclosure describes customizing profile content items in a particular manner, this disclosure contemplates customizing profile content items in any suitable manner.

Figure 4:
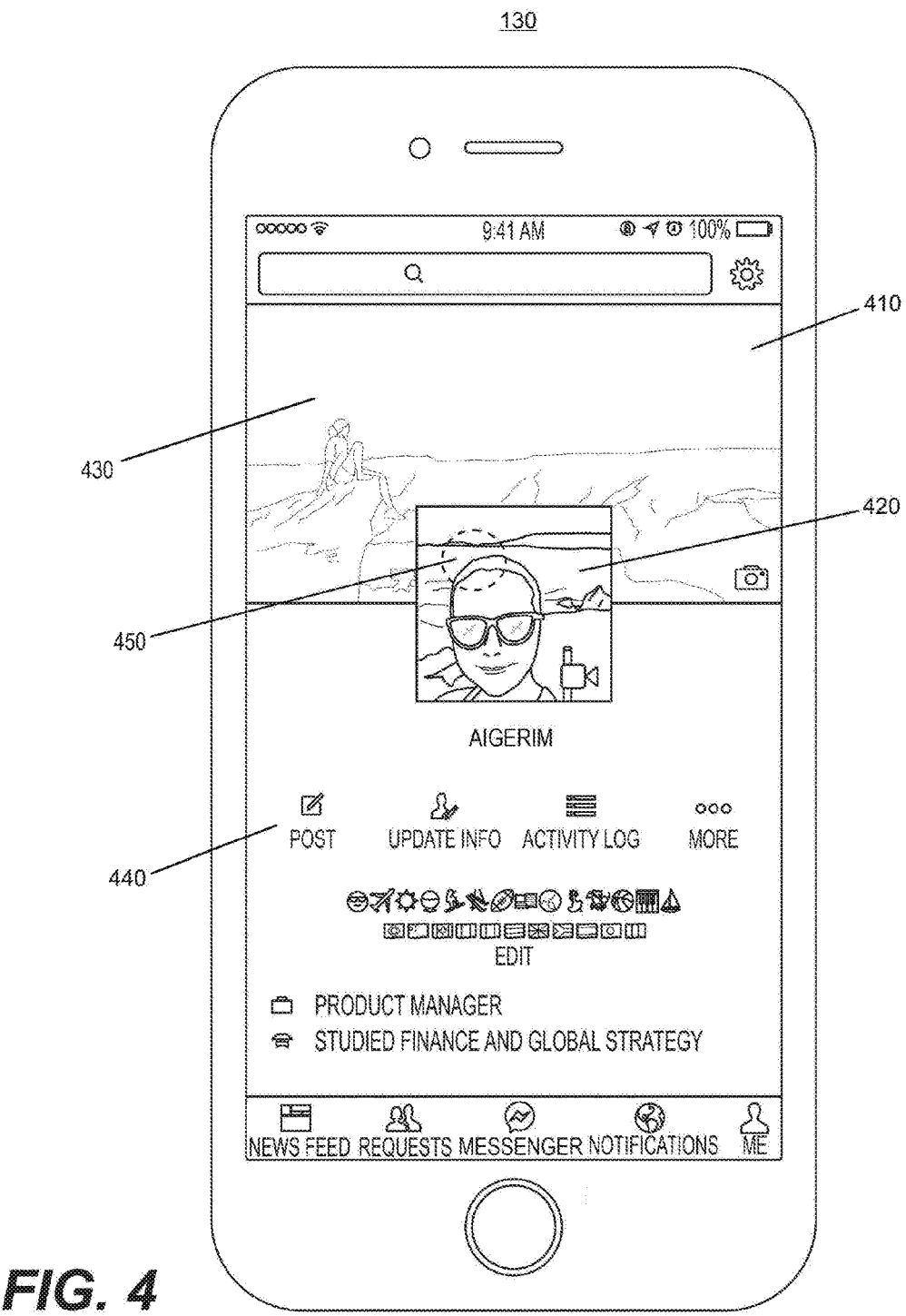
FIGS. 4-6 illustrate an example user interface associated with editing a user's profile on the communication system according to some embodiments.
Figure 5:
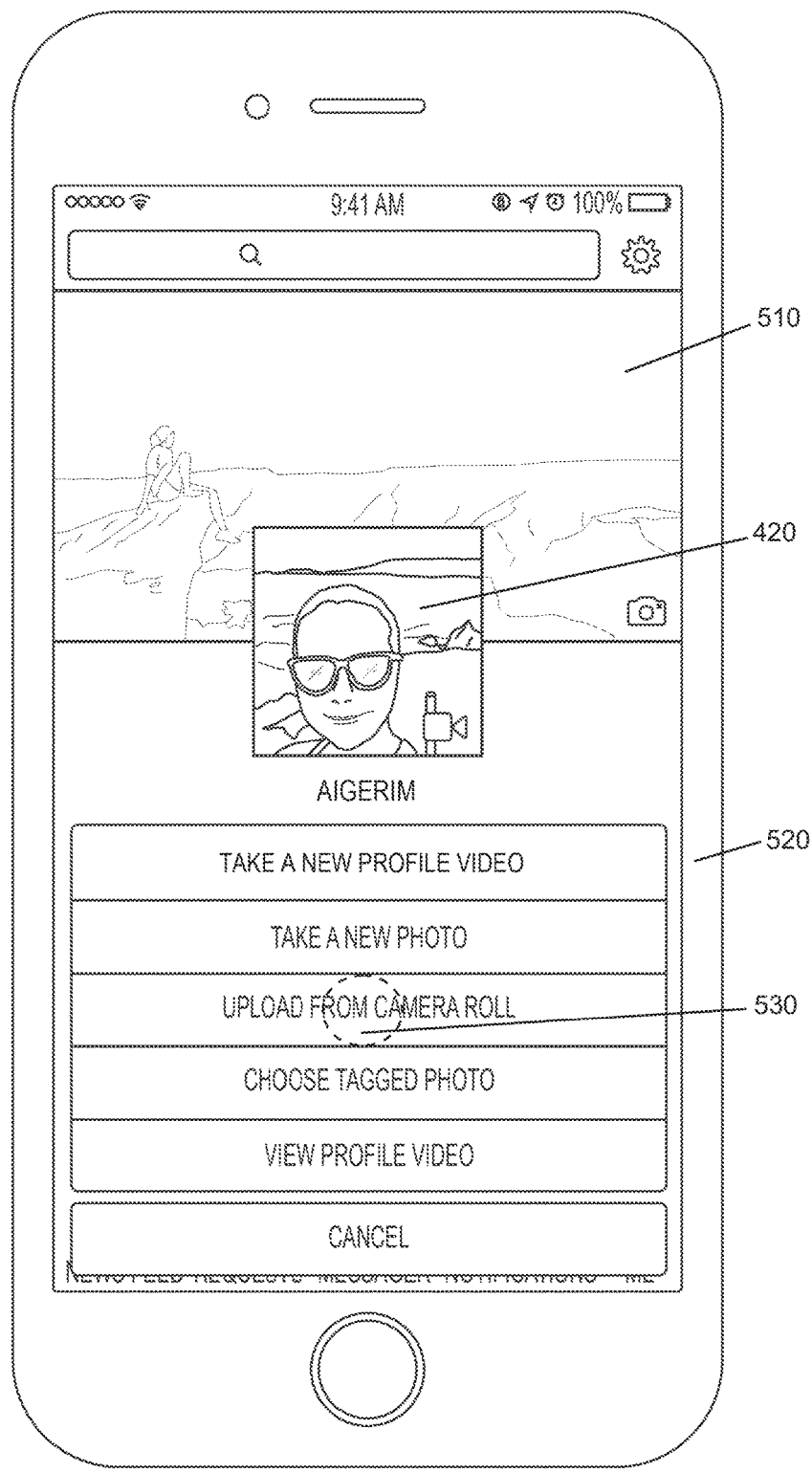
Figure 6:
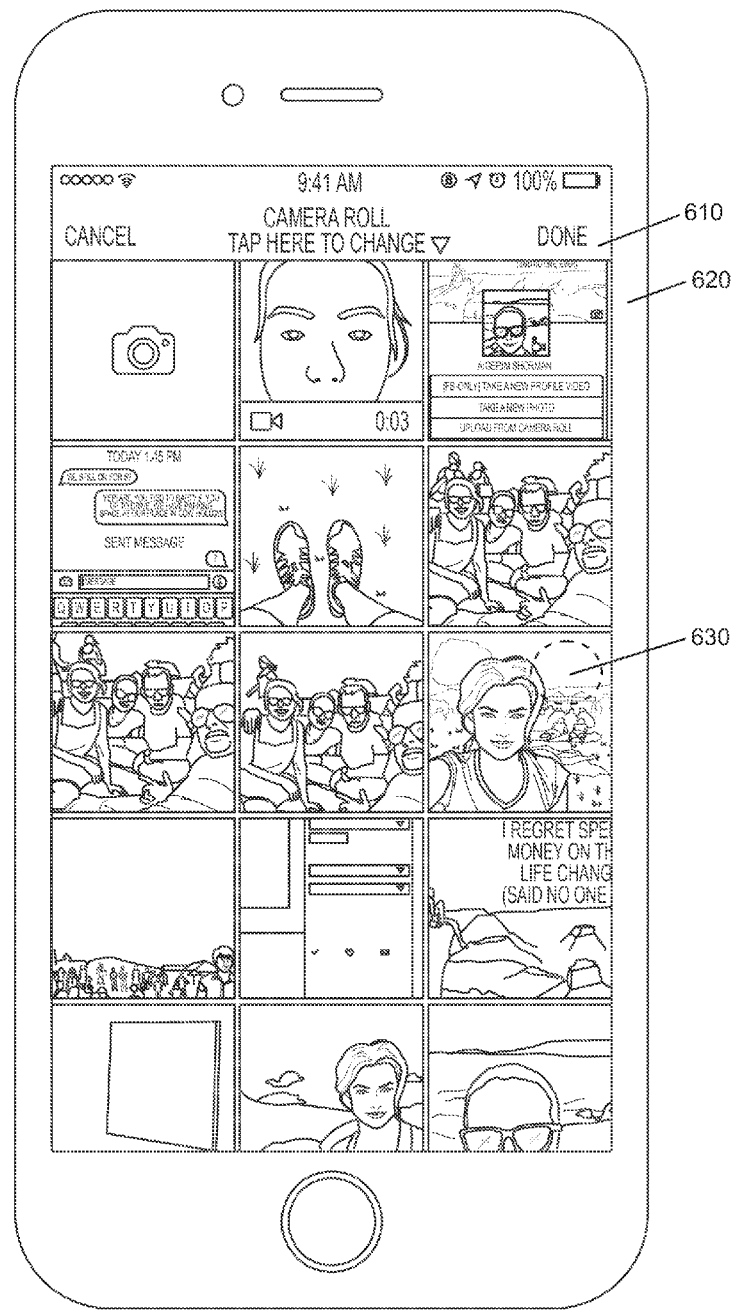

In particular embodiments, the social-networking system may receive, from mobile client system 130 of a first user, a user input to change a content item associated with a profile of the first user. FIGS. 4-6 illustrate an example user interface associated with editing a user's profile page on the communication system according to some embodiments. As discussed above, in particular embodiments, the communication system may include social-networking system 160. As shown in FIG. 4, a user interface (UI) 410 showing a profile page of the first user (e.g., "Aigerim") is displayed on mobile client system 130. A number of different content items are displayed on UI 410, including a profile picture 420 of the first user, a background picture 430, and various interactive option items 440 (e.g., "post," "update info," "activity log," "more," and "edit"). The first user may interact with any of these content items to edit her profile page. As an example and not by way of limitation, the first user may interact with profile picture 420 by user interaction 450 (e.g., by "clicking" or "tapping" profile picture 420) to interact with profile picture 420. After the first user interacts with profile picture 420, as shown in FIG. 5, the user interface displayed on mobile client system 130 transitions to UI 510 that includes profile picture 420 and a list of menu options 520 for editing profile picture 420 (e.g., "take a new profile video," "take a new photo," "upload from camera roll," "choose tagged photo," "view profile video," and "cancel"). The first user may edit profile picture 420 by choosing any of the options listed in the list of menu options 520. As an example and not by way of limitation, the first user may interact with the "upload from camera roll" menu option by user interaction 530 (e.g., by "clicking" or "tapping" the specific menu option) to access pictures in the first user's camera roll. After the first user interacts with the menu option, as shown in FIG. 6, the user interface displayed on mobile client system 130 transitions to UI 610 showing a plurality of pictures 620. The first user may then select from the plurality of pictures 620 to edit (e.g., replace) her profile picture. As an example and not by way of limitation, the first user may selected a picture of the plurality of pictures 620 by interacting with the picture by user interaction 630 (e.g., by "clicking" or "tapping" the picture) to select the picture. Although this disclosure describes selecting a user-profile content item in a particular manner, this disclosure contemplates selecting a user-profile content item in any suitable manner.

In particular embodiments, the communication system may access, from a data store of the communication network, user information associated with a first user of the communication network. As discussed above, in particular embodiments, the communication system may include social-networking system 160, and the communication network may include the online social network. As an example and not by way of limitation, the communication system may access data store 164 for the user information associated with the first user. In particular embodiments, the user information associated with the first user may include geo-location information determined by mobile client system 130. As discussed above, the communication component coupled to antennae 330, 340 of mobile client system 130 may be configured to determine location data based on GPS signals, cellular triangulation, wireless hotspots, or any suitable methods for determining location data. In particular embodiments, the communication system may access a social graph 200 of the online social network for the user information associated with the first user. The user information associated with the first user may include social-graph information determined based on the nodes (e.g., corresponding to social-networking entities) of the social graph 200 of the online social network. As an example and not by way of limitation, the user information may include user-background information and/or user interests (e.g., schools the user attended, sports teams the user likes and/or follows, music and artists the user likes and/or follows, volunteering or nonprofit organizations that the user likes and/or follows, etc.), calendar information (e.g., national holidays, birthdays, etc.), user-generated content (e.g., view, posts, reshares, comments, "likes," etc. on the user's own content), user interactions with content on the online social network (e.g., views, posts, re-shares, comments, "likes," etc. on other user's content), news stories (e.g., current events, environmental disasters), user-affinity information (e.g., information on the user's friends, family, first-degree contacts, second-degree contacts, etc.), and any other suitable user-related content. Although this disclosure describes accessing particular user information and user-profile content in a particular manner, this disclosure contemplates accessing any suitable user information and user-profile content in any suitable manner.

In particular embodiments, the communication system may identify one or more entities associated with the communication network that are relevant to the first user based on the user information in order to retrieve one or more user-profile content items. As discussed above, an entity may be a user, an enterprise, a business, a third-party application, a group, a concept, etc. In addition, as discussed above, in particular embodiments, the communication system may include social-networking system 160, and the communication network may include the online social network. In particular embodiments, the one or more entities relevant to the first user may be determined based on the geo-location information of the first user. As an example and not by way of limitation, the communication system may determine entities relevant to the geo-location of the first user (e.g., a determination that the first user is located in Hawaii may correspond to an entity of the Hawaii tourism board, Disney's Aulani resort, etc.). In particular embodiments, the one or more entities relevant to the first user may be determined based on a user selection. As an example and not by way of limitation, as shown in FIG. 6, the communication system may display the plurality of pictures 620 taken from the first user's camera roll, and the user may select one of the pictures (e.g., through interaction 630). In particular embodiments, the one or more entities relevant to the first user may be determined based on one or more social signals associated with the first user. As an example and not by way of limitation, the communication system may determine that one or more entities are relevant to the first user through user interests (e.g., schools the user attended and/or follow, sports teams the user likes and/or follows, music and artists the user likes and/or follows, volunteering or nonprofit organizations that the user likes and/or follows, etc.), user-generated content (e.g., view, posts, reshares, comments, "likes," etc. on the user's own content), and user interactions with content on the social-networking system (e.g., views, posts, re-shares, comments, "likes," etc. on other user's content). In particular embodiments, the one or more entities relevant to the first user may be determined based on the social-graph information associated with the first user. As an example and not by way of limitation, the communication system may determine that one or more entities are relevant to the first user through user-background information (e.g., schools the user attended, sports teams the user likes and/or follows, music and artists the user likes and/or follows, volunteering or nonprofit organizations that the user likes and/or follows, etc.), calendar information (e.g., national holidays, birthdays, etc.), news stories (e.g., current events, environmental disasters), and user-affinity information (e.g., information on the user's friends, family, first-degree contacts, second-degree contacts, etc.). In particular embodiments, the one or more entities relevant to the first user are determined based on any combination of the geo-location of the user, the user selection, the social signals associated with the first user, and the social-graph information associated with the first user. Although this disclosure describes identifying particular entities in a particular manner, this disclosure contemplates identifying any suitable entities in any suitable manner.

In particular embodiments, the communication system may retrieve, for each identified entity, one or more user-profile content items. As discussed above, in particular embodiments, the communication system may include social-networking system 160. The user-profile content items may include one or more content frames associated with the entity. Each content frame may be configured to be displayed in association with a particular content item associated with the first user. As discussed above, the user-profile content items may include profile pictures, in addition to frames that visually overlap at least a portion of a profile picture. In particular embodiments, a customization feature for user-profile content items includes selecting one or more frames for other user-profile content items (e.g., a user's profile picture). Content frames may be generated by the online social network or by a particular social-networking entity (e.g., a social-networking entity connected to the first user via the social graph 200, any entities associated with the one or more second nodes, etc.). As an example and not by way of limitation, content frames may be generated by the communication system based on geo-location information for the user, which may be determined based on GPS information, as discussed above. As another example and not by way of limitation, the communication system may be based on information on nearby friends, as discussed in U.S. patent application Ser. No. 14/323,915, filed 3 Jul. 2014, incorporated by reference herein; information on beacons or other suitable geographic-positioning-capable devices or systems associated with a third-party content provider, as discussed in U.S. patent application Ser. No. 14/565,371, filed 9 Dec. 2014, incorporated by reference herein; and/or user check-in information in which a suggested frame is presented in a reaction card post-check-in, as discussed in U.S. patent application Ser. No. 14/466,269, filed 22 Aug. 2014, incorporated by reference herein. As another example and not by way of limitation, the communication system may provide recommendations of social-network-generated stock content frames for a particular vacation destination (e.g., Hawaii), or custom content frames provided by various entities and/or sponsors (e.g., a content frame from the Hawaii tourism board; a frame from Disney's Aulani resort in Hawaii). As another example and not by way of limitation, content frames may be generated by social-networking entities corresponding to groups and/or events that the first may be connected to or otherwise associated with (e.g., sports teams, various causes, political campaigns, etc., for which the first user has a strong affinity, liked, or interacted with, and which may be determined based on the user information), and these content frames may be selected by the first user to be displayed with a user-selected picture to generate a temporary user profile picture that conveys a particular message (e.g., support for a particular sport team, a volunteer cause, political party, etc.). In particular embodiments, content frames may be stationary (e.g., still content-frame overlays), moving (e.g., animated content frames), or interactive (e.g., content frames that change/move when selected or interacted with, and may use movement sensors, the accelerometer, and other hardware components on mobile client system 130 to change the appearance and/or accept interactive inputs to change the appearance of the temporary profile picture). Although this disclosure describes retrieving particular user-profile content items in a particular manner, this disclosure contemplates retrieving user-profile content items in any suitable manner.

Figure 7A:
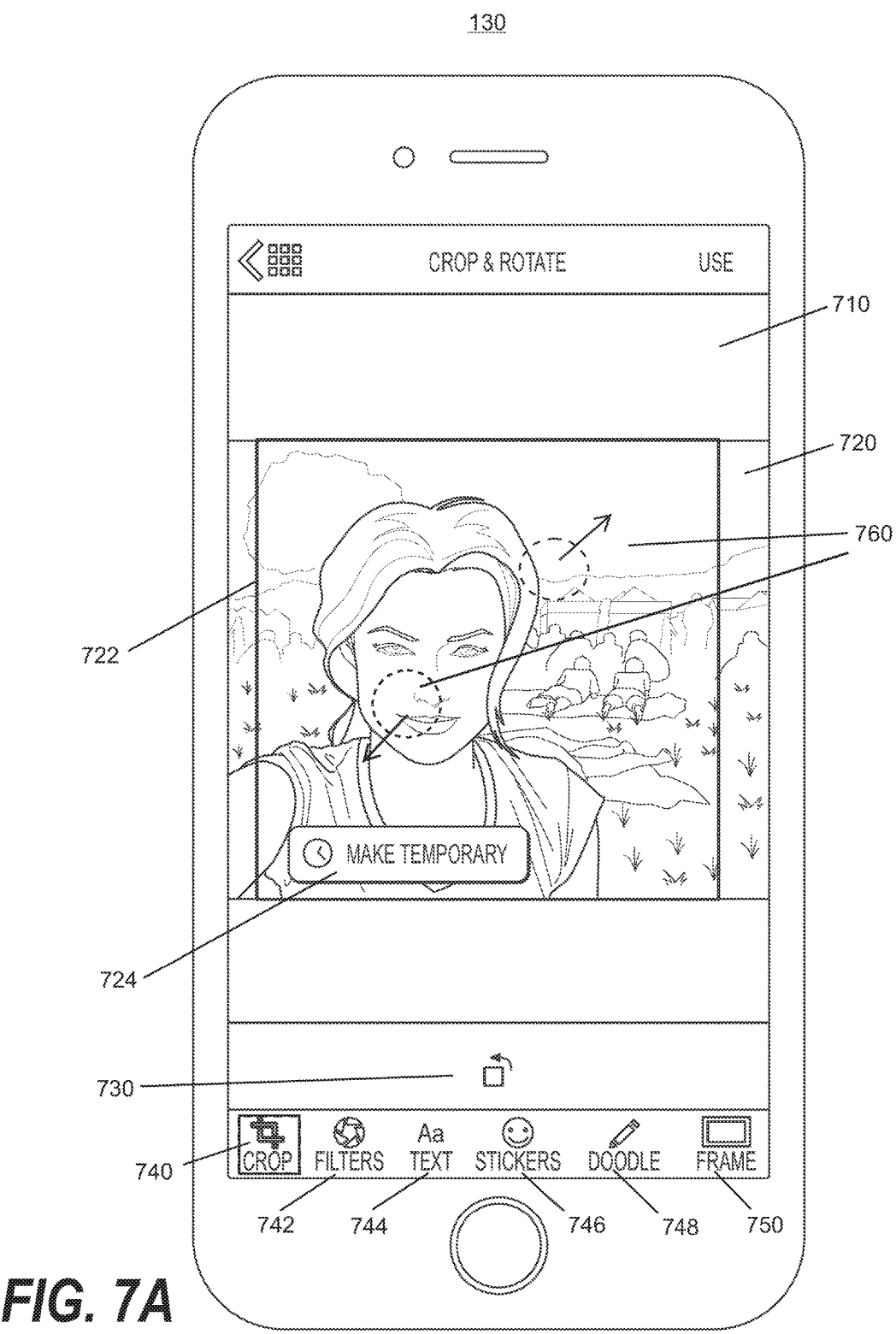
FIGS. 7A-7G illustrate an example user interface associated with selecting temporary profile updates with content frames on the communication system according to some embodiments.
Figure 7B:
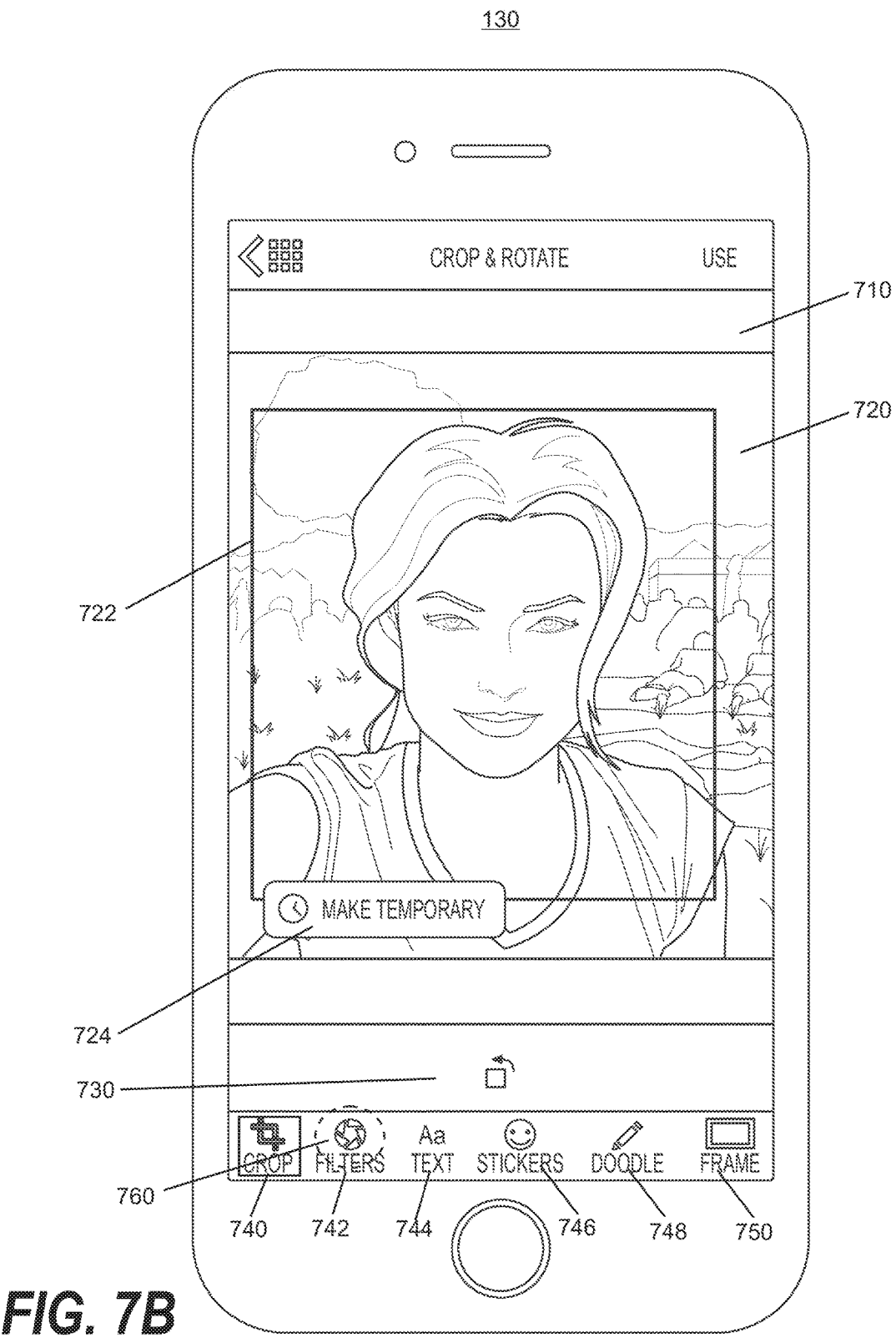
Figure 7C:
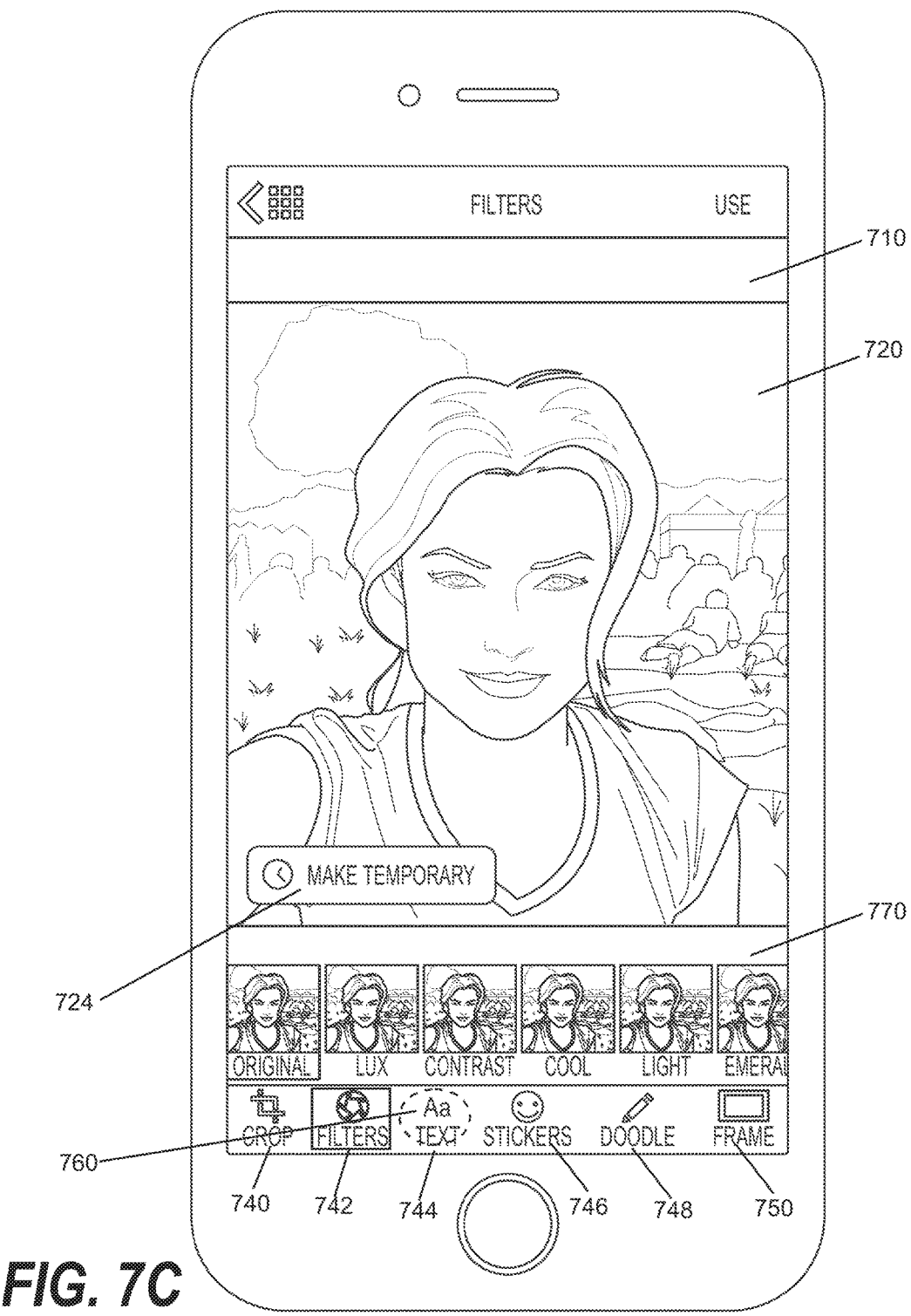
Figure 7D:
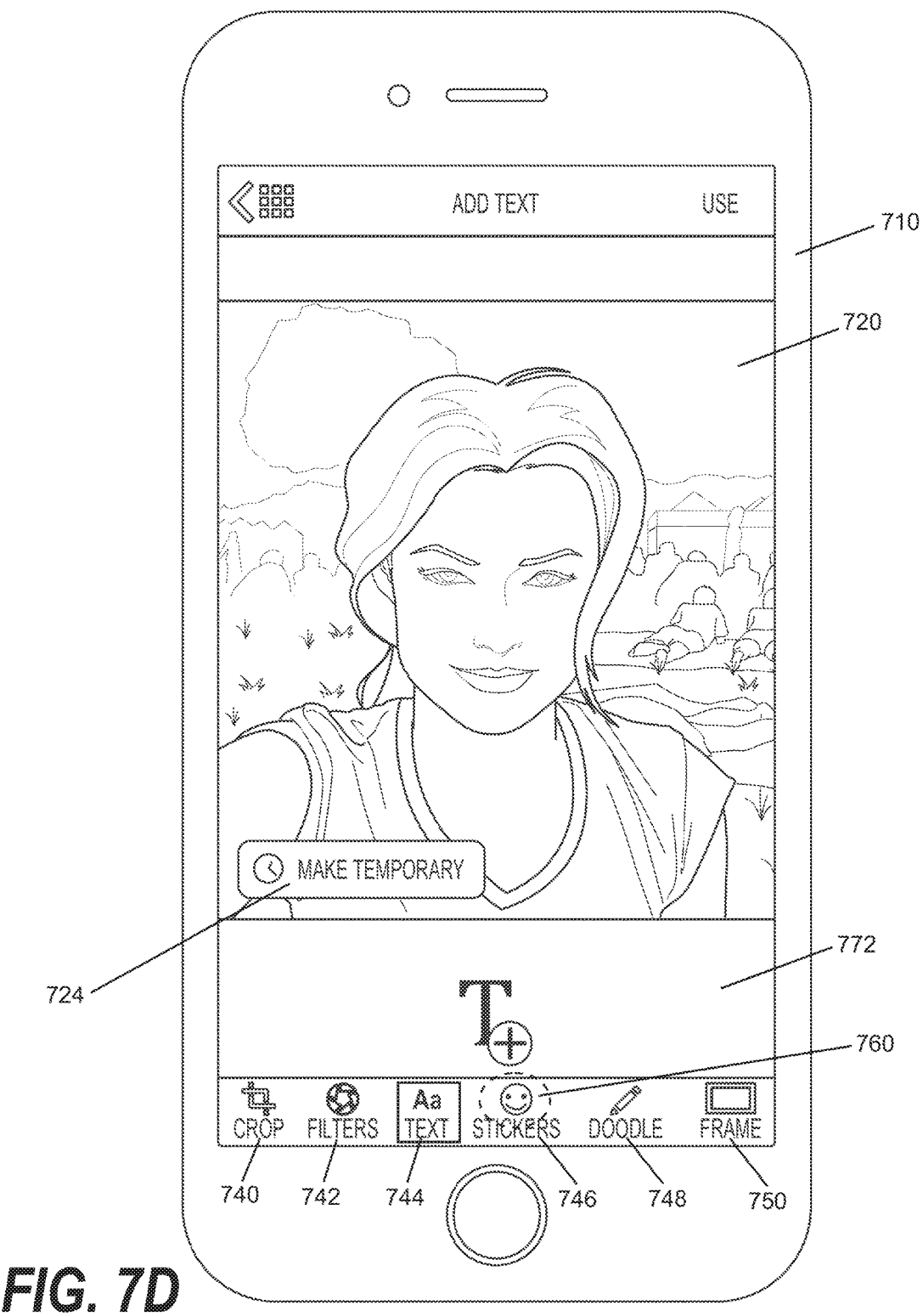
Figure 7E:
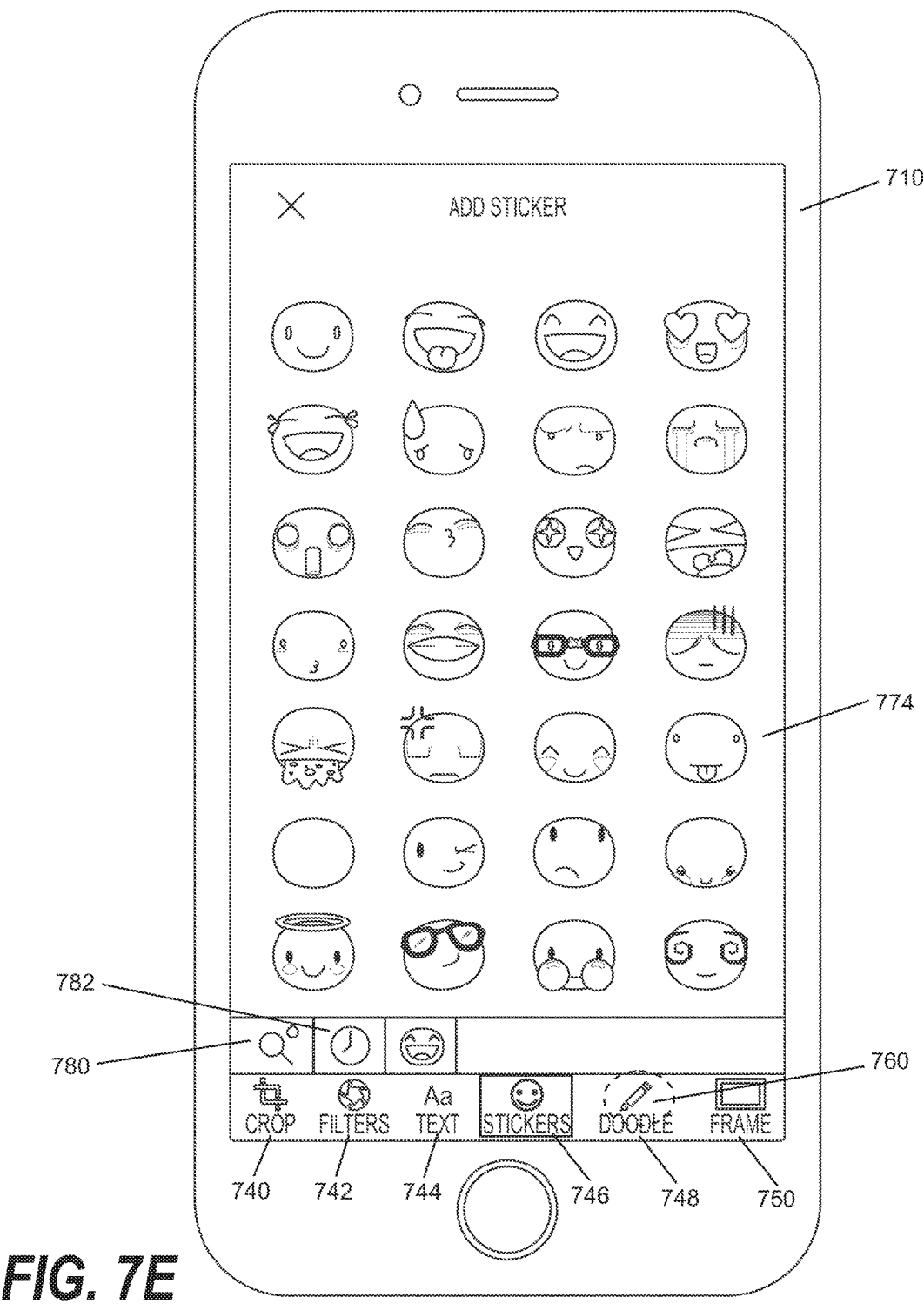
Figure 7F:
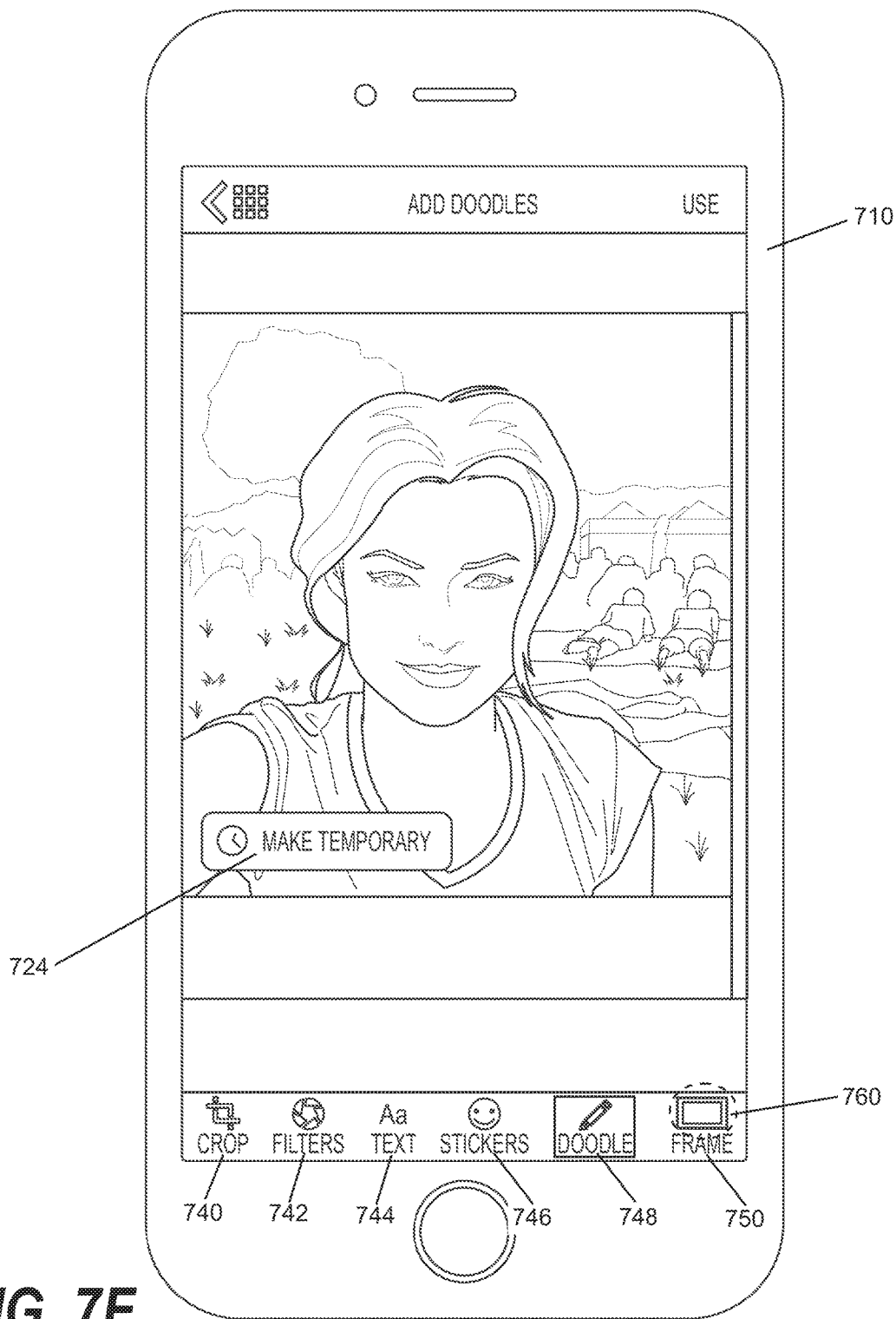
Figure 7G:
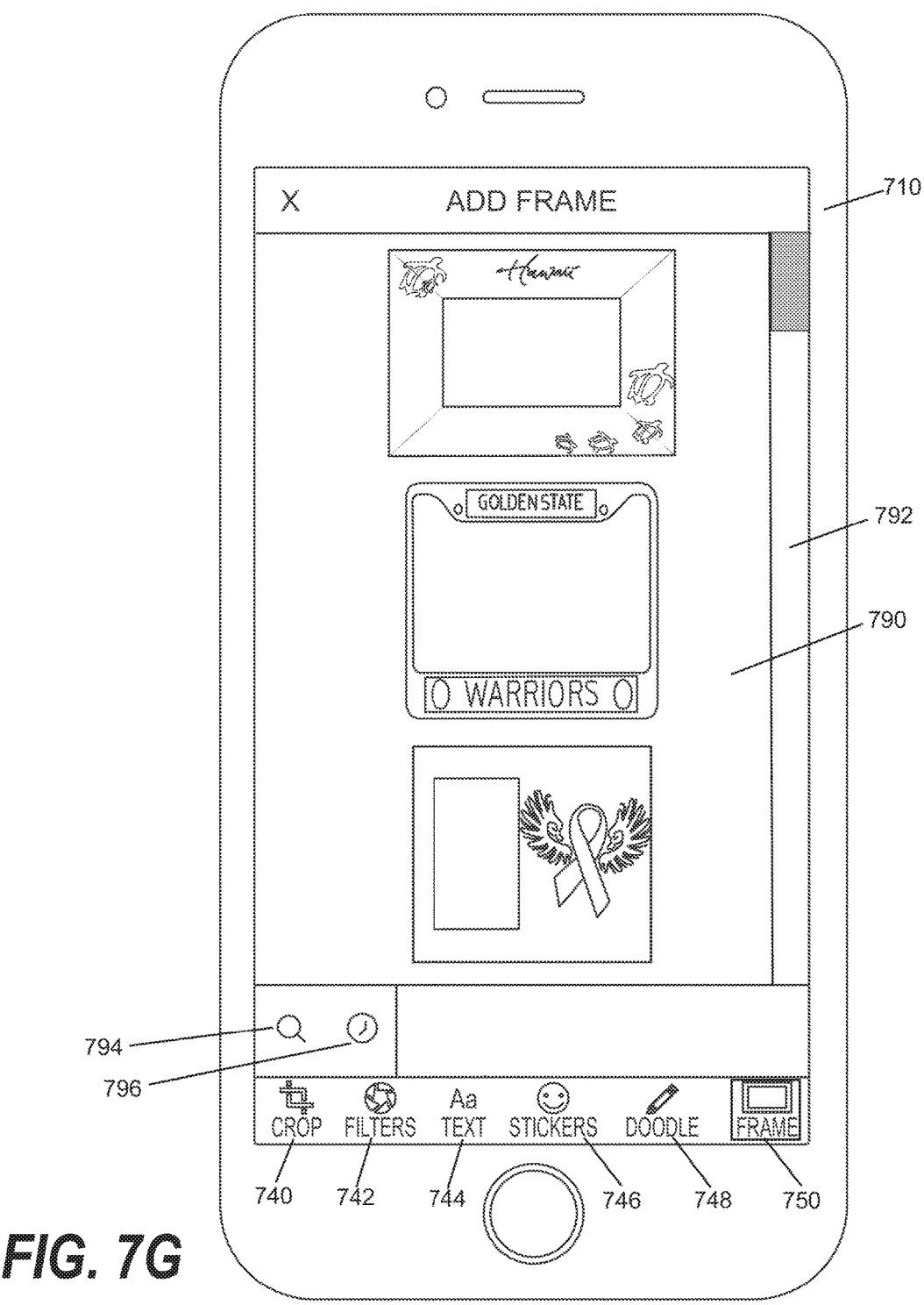

FIGS. 7A-7G illustrate an example user interface associated with selecting temporary profile updates with content frames on the communication system according to some embodiments. As shown in FIG. 7A, a UI 710 shows a user interface for editing a user-profile content item that includes a user-selected profile picture 720 to be edited, a display square 722 that indicates what portion of user-selected profile picture 720 that will be displayed on the user's profile, a "make temporary" option 724 to make the user-selected profile picture 720 displayed for a temporary period of time, a picture-orientation flip option 730, a crop option 740, a filters option 742, a text option 744, a stickers option 746, a doodle option 748, and a frame option 750, discussed in more detail below. UI 710 may be for cropping and rotating profile picture 720 (e.g., UI 710 shows the user interface corresponding to the selection of crop option 740). When the first user interacts with profile picture 720 via user interaction 760 in order to crop profile picture 720 by expanding the picture so that a portion of profile picture 720 is selected in display square 722, as shown in FIG. 7B. Next, the first user may select filters option 742 by interacting with the option via user interaction 760, which changes UI 710 to a user interface showing a plurality of filter options 770 (e.g., "original," "lux," "contrast," "cool," "light, etc.), as shown in FIG. 7C. The first user may then select text option 744 by interacting with the option via user interaction 760, which changes UI 710 to a user interface showing a text box 772 which allows the user to type in a comment or message to be displayed with profile picture 720, as shown in FIG. 7D. The first user may then select stickers option 746 by interacting with the option via user interaction 760, which changes UI 710 to a user interface showing a plurality of sticker images 774 that the first user may select to "adhere" to the profile picture 720, as shown in FIG. 7E. In addition, UI 710 may include a search option 780 to search for particular sticker images, a "make temporary" option 782 to make the selected stick displayed on profile picture 720 for a temporary period of time, and a more-stickers option 784 for additional types of stickers. UI 710 may also be scrollable such that more stickers 774 are shown when a user scrolls down the page. The first user may then select doodle option 748 by interacting with the option via user interaction 760, which changes UI 710 to a user interface which allows the first user to free-form draw on profile picture 720, as shown in FIG. 7F. Then, the first user may select frame option 760 by interacting with the option via user interaction 760, which changes UI 710 to a user interface showing a plurality of content frames 790 that the first user may select to display as a frame around profile picture 720, as shown in FIG. 7G. UI 710 may include a scroll bar 792, a search option 794 to search for particular content frames, and a "make temporary" option 796 to make the selected content frame displayed with profile picture 720 for a temporary period of time. Although this disclosure describes a particular user interface associated with selecting particular content in a particular manner, this disclosure contemplates any suitable user interface associated with selecting any suitable content in any suitable manner.

In particular embodiments, the communication system may rank the one or more content frames based on the user information, and then send, to a client device 130 of the first user, one or more of the content frames for display to the first user in ranked order. As discussed above, in particular embodiments, the communication system may include social-networking system 160. Each of the one or more content frames may be associated with a relevance score, and the ranking of the one or more content frames may be based on the corresponding relevance score of each of the content items. In particular embodiments, the communication system may determine the relevance score based on weighing of factors including the determined geo-location of the first user, user interests (e.g., schools the user attended and/or follow, sports teams the user likes and/or follows, music and artists the user likes and/or follows, volunteering or nonprofit organizations that the user likes and/or follows, etc.), user-generated content (e.g., view, posts, reshares, comments, "likes," etc. on the user's own content), user interactions with content on the social-networking system (e.g., views, posts, re-shares, comments, "likes," etc. on other user's content), user-background information (e.g., schools the user attended, sports teams the user likes and/or follows, music and artists the user likes and/or follows, volunteering or nonprofit organizations that the user likes and/or follows, etc.), calendar information (e.g., national holidays, birthdays, etc.), news stories (e.g., current events, environmental disasters), and user-affinity information (e.g., information on the user's friends, family, first-degree contacts, second-degree contacts, etc.). The relevance score, r, may be calculated as a score corresponding to a particular user, k, given a particular weighing factors for a content frame, X. In other words, the relevance score may be calculated as $r=(k|X)$. As an example and not by way of limitation, a relevance score for a first user with respect to a particular content frame may calculated as a relevance score denoted as $r_{i,j,k}$. The input may be a weighing factors $X=(x_1, x_2, \ldots, x_N)$, and a set of classes. For each (i:j) and a class k, the communication system may compute $r_{i,j,k}=r(\text{class}(x_{i,j})=k|X)$.

In particular embodiments, the communication system may determine the relevance score based on weighing of factors including various commercialization avenues that may be available for the selection and ranking of both profile picture 720 and the selection of a content frame for framing profile picture 720. As discussed above, in particular embodiments, the communication system may include social-networking system 160. As an example and not by way of limitation, both profile picture 720 and the selection of a content frame for framing profile picture 720 may be selected by the first user based on a user search and/or based on recommendations presented to the first user. The recommendations presented to the first user may include advertisement-like recommendations such as suggested pictures and/or content frames (e.g., based on the geo-location of the first user, user interests, user-generated content, user interactions with content, user-background information, user calendar information, new stories on the first user's news-feed, user-affinity information, etc.), up-ranked and/or trending pictures and/or content frames (e.g., based on social-networking factors such as popularity and/or activity among the first user's friends or contacts on the social graph, regional or global popularity and/or activity, current time-specific popularity and/or activity, etc.), etc. In addition, the recommendations presented to the first user may also include pictures and/or content frames, and their corresponding pages (e.g., the profile pages of the social-networking entities) that the communication system has boosted or promoted for advertising purposes. As an example and not by way of limitation, the communication system may boost a particular picture and/or content frame by requiring certain user actions in order to use the picture and/or content frame (e.g., donate money to a charity). As another example and not by way of limitation, the communication system may boost a particular picture and/or content frame by allowing certain user actions after the first user selects a certain picture and/or frame (e.g., gain access to discounts). Although this disclosure describes the selection and ranking particular content in a particular manner, this disclosure contemplates the selection and ranking of any suitable content in any suitable manner.

Figure 8A:
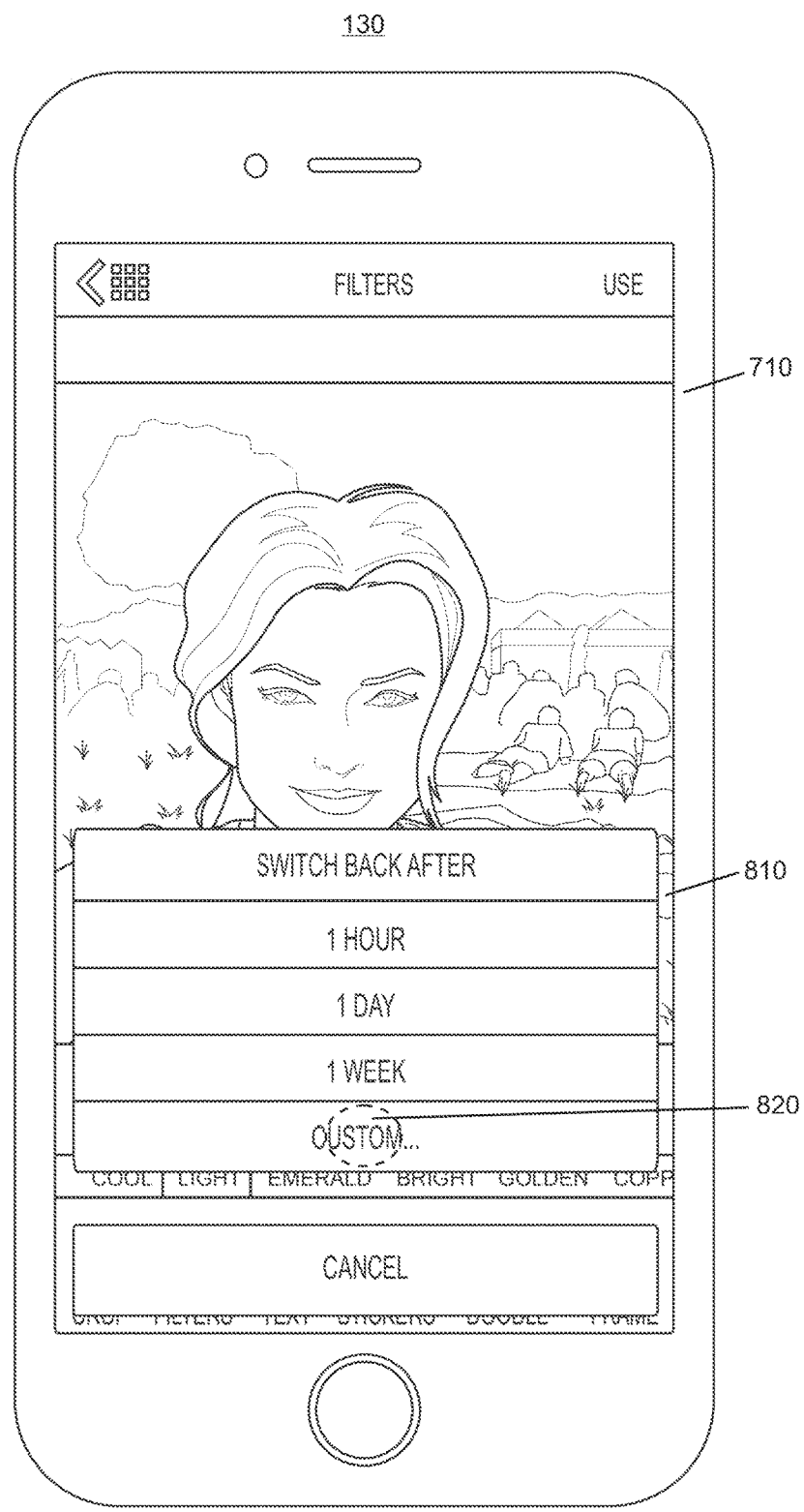
FIGS. 8A-8D illustrate an example user interface associated with setting a time period for the temporary profile updates on the communication system according to some embodiments.
Figure 8B:
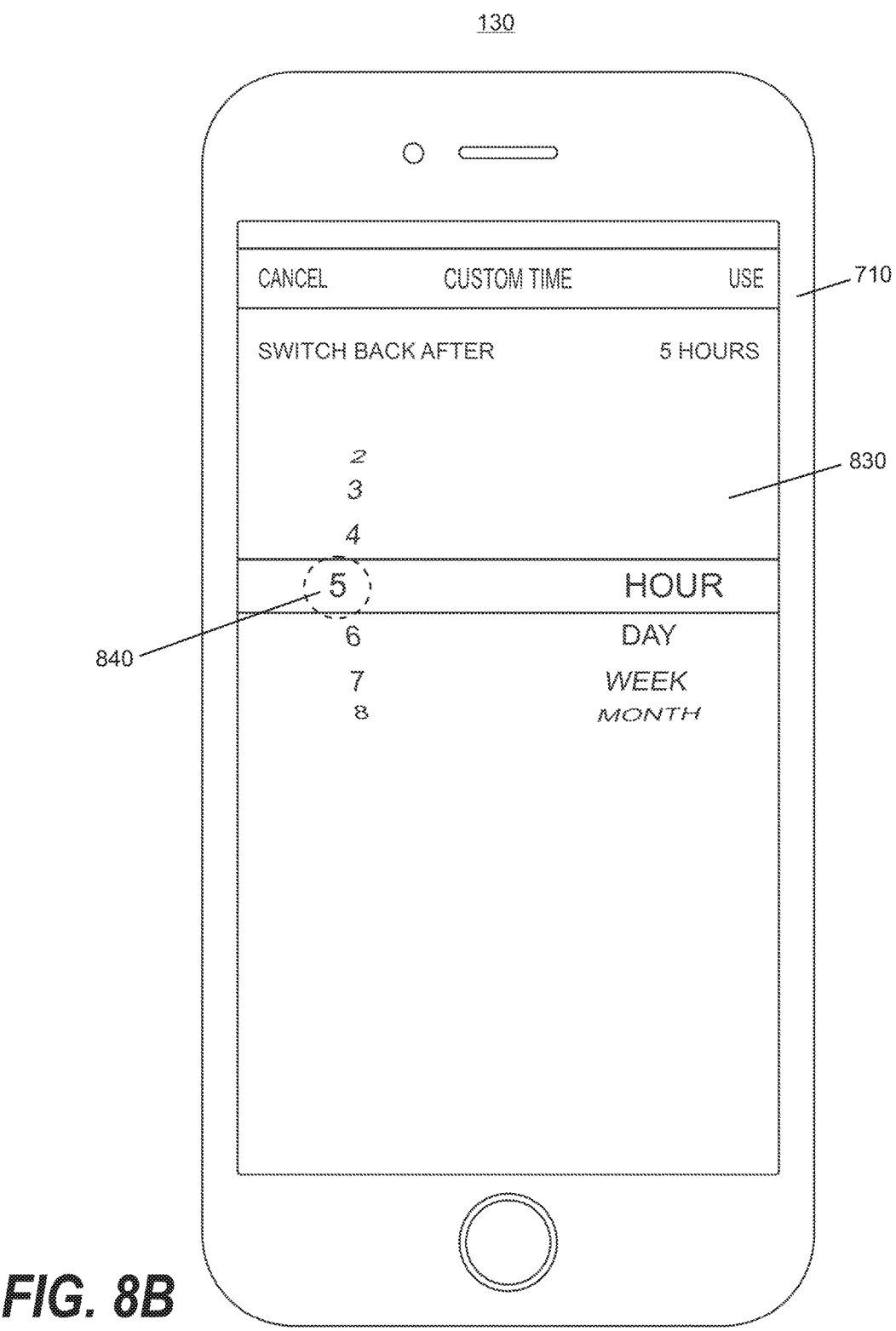
Figure 8C:
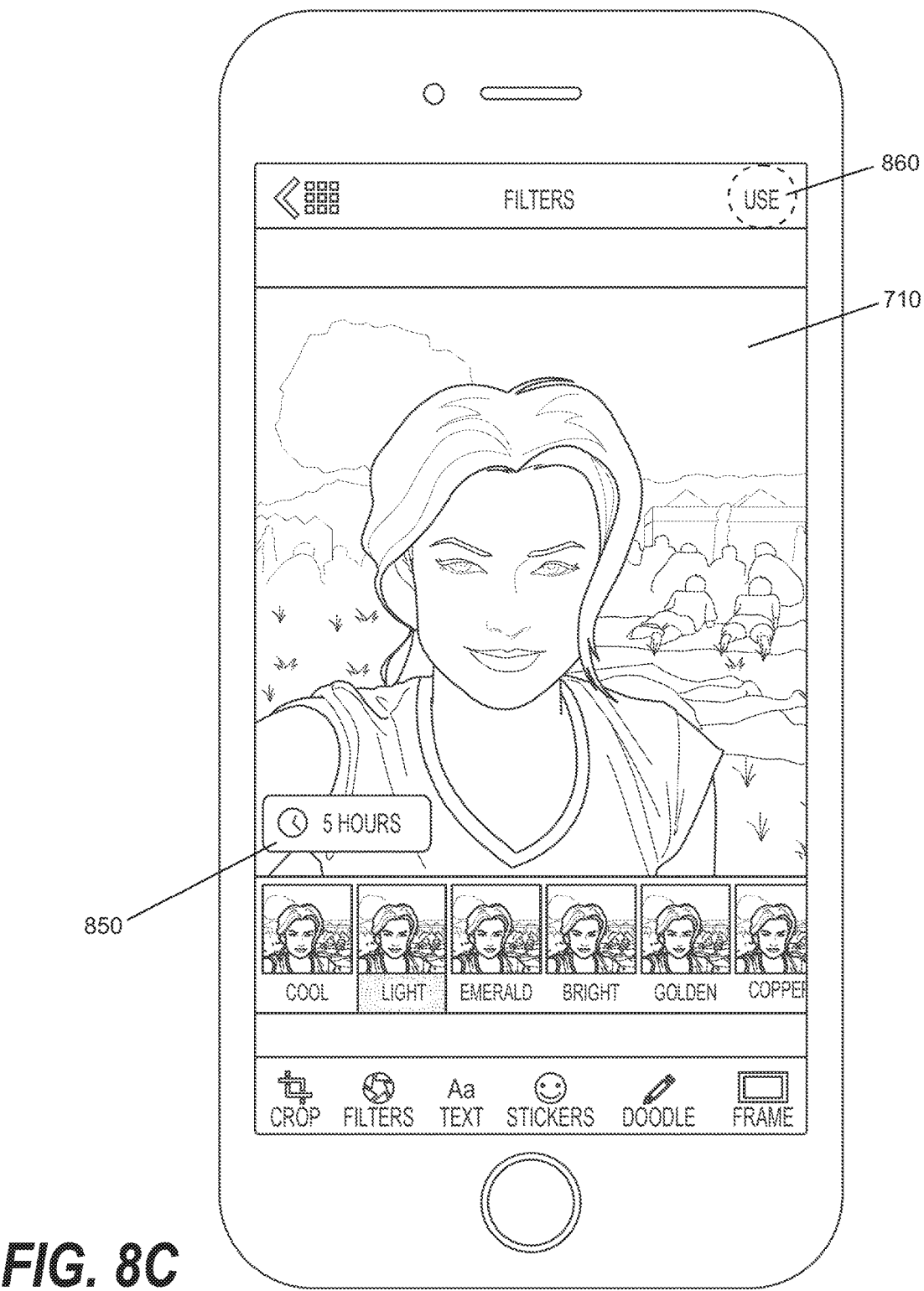
Figure 8D:
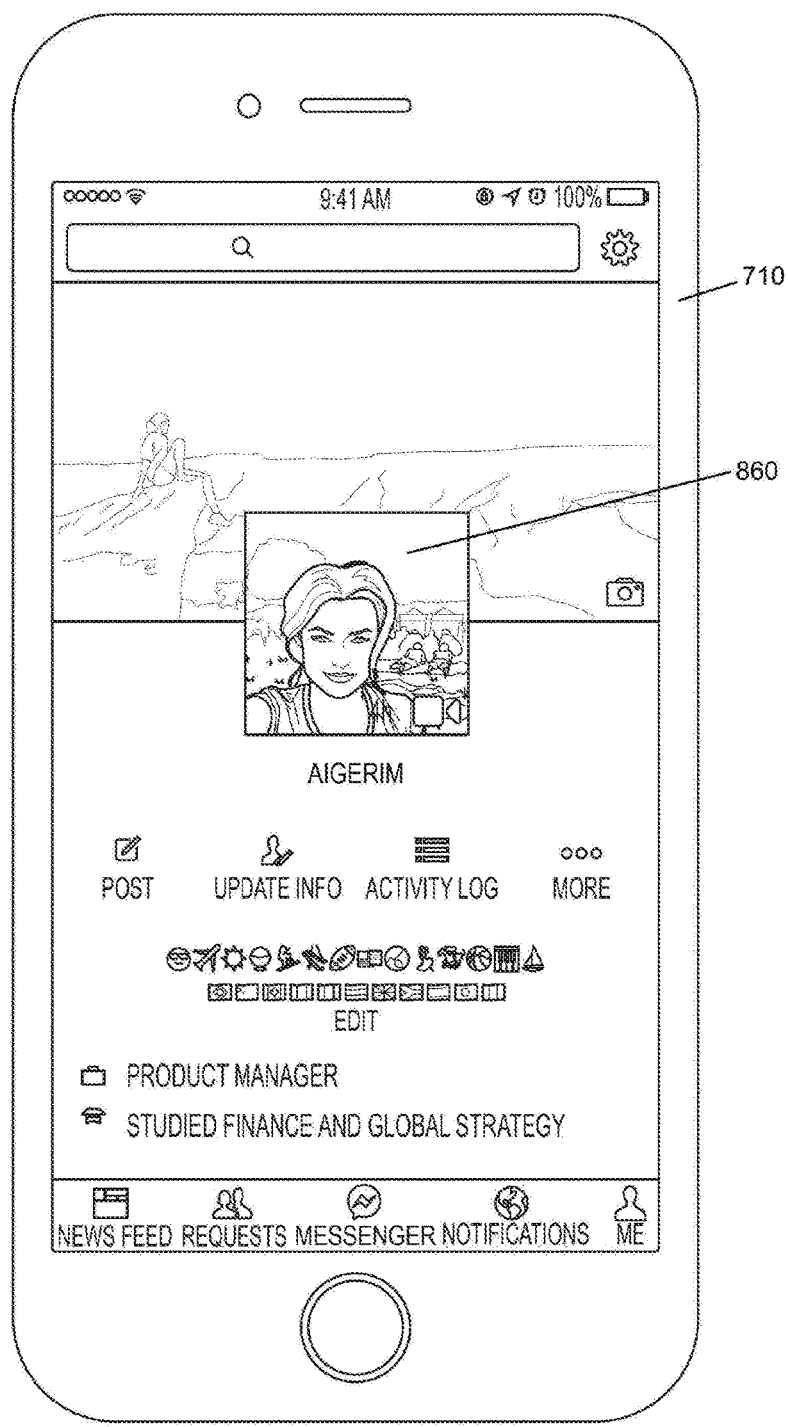

In particular embodiments, the communication system may, after sending the one or more content frames for display to the first user, receive, from mobile client system 130, a selection of a particular content frame of the one or more content frames, and then display, on mobile client system 130, the particular content frame in association with the profile of the first user for the specified period of time. As discussed above, in particular embodiments, the communication system may include social-networking system 160. Each content frame may be selectable by the first user to display the selected content frame in association with a particular content item for a specified period of time. In particular embodiments, after the specified period of time, the particular content frame may revert back to the previously-displayed content frame associated with the profile of the first user. Alternatively, after the specified period of time, the selected content frame may revert to a default content frame. FIGS. 8A-8D illustrate an example user interface associated with setting a time period for the temporary profile updates on the communication system according to some embodiments. As shown in FIG. 8A, after the first user selects the "make temporary" option 724, 782, 796 (shown in FIGS. 7E-7G), the UI 710 may include a time-limit option 810 for user selection. Time-limit option 810 may include an option to switch back (e.g., to a previously-selected profile content item or a default content item) after one hour, one day, one week, or a custom time option. If, for example, the first user selects the custom time option via a user interaction 820, then UI 710 changes to show time-selection option 830 that allows the first user to make a section of a number and a selection of hours, days, weeks, or months, as shown in FIG. 8B. When the first user selects "5 hours" via a user interaction 840, the UI 710 next changes back to showing profile picture 720 in which the "make temporary" option 724 now indicates the user-selected 5 hours as the amount of time profile picture 720 will be displayed before reverting back, as shown in FIG. 8C. Once the first user is satisfied with all of her selections, she can interact via a user interaction 860 to "use" the finalized profile picture 720. Then, as shown in FIG. 8D, UI 710 once again displays the user interface showing the profile page of the first user including newly-selected profile picture 860, which will remain on the profile page of the first user for five hours before reverting back (e.g., to previously-selected profile picture 430 in FIG. 4, or alternatively, to a default profile picture, not shown).

In particular embodiments, the specified time period may be a customizable feature for the profile content item (e.g., user-profile picture and/or the content frame). As an example and not by way of limitation, the user-profile picture and/or content frame may be set to display and then revert back automatically based on user-selected times (e.g., user selects to display temporary profile picture on Monday, and then for only five days), event-dependent times (e.g., a sports game that lasts one night), location-based times (e.g., only when a user is in Hawaii for vacation, reverting back when the communication system detects the user has returned home), user check-in times (e.g., a work convention that last 3 days, reverting back on the day after the convention end), etc. As another example and not by way of limitation, the selection of the timing of how long the user-profile picture and/or content frame are displayed before reverting back may be determined by a third-party social-networking entity (e.g., the sports page where a frame is taken from can set the reversion time as the time when a game finishes). In particular embodiments, UI 710 shown in FIG. 8B for selecting a custom time option may include one or more intelligent time options based on the user-profile picture and/or content frame selected. As an example and not by way of limitation, a content frame associated with a particular sporting event or sports team may include an option of reverting back after the sports team finishes a particular event or game. As another example and not by way of limitation, a content frame associated with a particular geographic location (e.g., Hawaii) may include an option of reverting back when the communication system determines that the first user is no longer at the geographic location (e.g., by determining that a vacation ended because the user has "checked-in" on the online social network at an airport, or by determining that the GPS location of the first user is no long at a particular location, etc.). Although this disclosure describes customization of the specified time period associated with a profile picture and/or content frame in a particular manner, this disclosure contemplates customization of the specified time period associated with a profile picture and/or content frame in any suitable manner.

Figure 9:
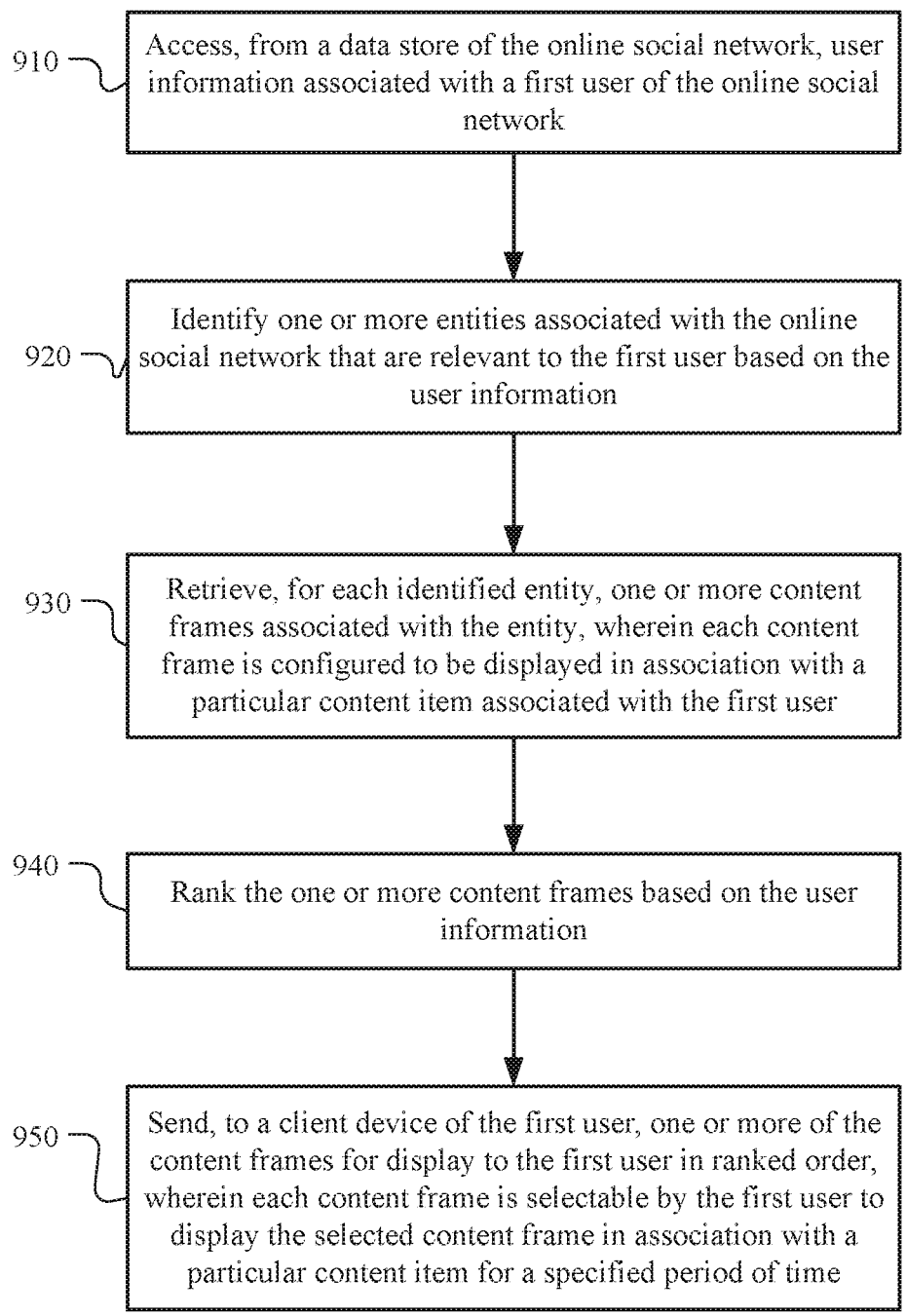
FIG. 9 illustrates an example method 900 for identifying and displaying a selected content frame in association with a content item for a specified period of time.

FIG. 9 illustrates an example method 900 for identifying and displaying a selected content frame in association with a content item for a specified period of time. The method may begin at step 910, where the communication system may access, from a data store of the communication network, user information associated with a first user of the communication network. As discussed above, in particular embodiments, the communication system may include social-networking system 160, and the communication network may include the online social network. At step 920, the communication system may identify one or more entities associated with the online social network that are relevant to the first user based on the user information. At step 930, the communication system may retrieve, for each identified entity, one or more content frames associated with the entity, wherein each content frame is configured to be displayed in association with a particular content item associated with the first user. At step 940, the communication system may rank the one or more content frames based on the user information. At step 950, the communication system may send, to a client device of the first user, one or more of the content frames for display to the first user in ranked order, wherein each content frame is selectable by the first user to display the selected content frame in association with a particular content item for a specified period of time. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for identifying and displaying a selected content frame in association with a content item for a specified period of time including the particular steps of the method of FIG. 9, this disclosure contemplates any suitable method for identifying and displaying a selected content frame in association with a content item for a specified period of time including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Social Graph Affinity and Coefficient

In particular embodiments, the communication system may determine the social-graph affinity (which may be referred to herein as "affinity") of various social-graph entities for each other. As discussed above, in particular embodiments, the communication system may include social-networking system 160. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system context directed to the user. As an example and not by way of limitation, an advertisement may display information about a friend of the user within social-networking system 160 who has taken an action associated with the subject matter of the advertisement.

Systems and Methods

Figure 10:
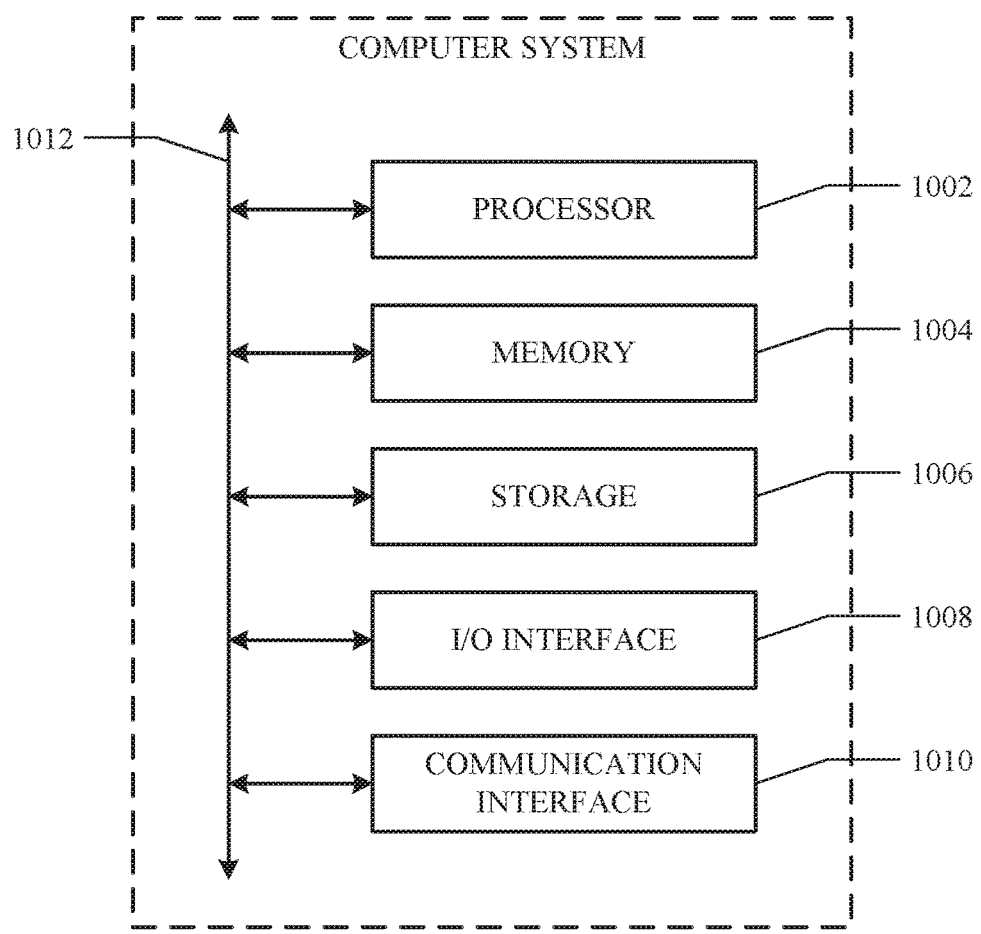
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices of a communication network:
   accessing, from a data store of the communication network, user information associated with a first user of the communication network;
   identifying one or more entities associated with the communication network that are relevant to the first user based on the user information;
   identifying a particular visual content item associated with the first user;
   retrieving, for each identified entity one or more content frames associated with the entity, wherein each content frame is configured to be displayed in association with the particular visual content item, and wherein each content frame is a customized overlay frame applicable to the particular visual content item;
   ranking the one or more content frame based on the user information; and
   sending, to a client device of the first user, instructions for presenting one or more of the content frames as recommended customized overlay frames for the particular visual content item, wherein the one or more content frames are presented in ranked order, and wherein each content frame is selectable by the first user, and the selected content frame is displayed as a temporary overlay overlapping a non-complete portion of the particular visual content item for a period of time specified by the first user, wherein after the specified period of time the selected content frame is removed from the particular visual content item.

2. The method of claim 1, further comprising, prior to accessing the user information from the data store:
   receiving, from a client device of a first user, a user input to change a visual content item associated with a profile of the first user.

3. The method of claim 2, further comprising, after sending the one or more content frames for display to the first user:
   receiving, from the client device of the first user, a selection of a particular content frame of the one or more content frames; and
   displaying, on the client device of the first user, the particular content frame in association with the profile of the first user for the specified period of time.

4. The method of claim 3, wherein when the first user selects the particular content frame of the selectable content frames, the particular content frame replaces a previously-displayed content frame associated with the profile of the first user.

5. The method of claim 1, wherein each of the one or more content frames is associated with a relevance score, and
   wherein the ranking of the one or more content frames is based on the corresponding relevance score with respect to the particular visual content item.

6. The method of claim 1, wherein the specified period of time is determined by:
   a user input from the first user,
   a user-specific time period associated with a user action, or any combination thereof.

7. The method of claim 1, wherein the user information associated with the first user comprises geo-location information determined by the client device of the first user.

8. The method of claim 1, further comprising:
   accessing a social graph of the communication network comprising a plurality of nodes and a plurality of edges connecting the nodes, each of the edges between two of the nodes representing a single degree of separation between them, the nodes comprising:
   a first node corresponding to the first user; and
   a plurality of second nodes corresponding to a plurality of entities associated with the communication network, respectively,
   wherein the plurality of entities includes the one or more entities that are relevant to the first user identified based on the user information.

9. The method of claim 8, wherein the user information associated with the first user comprises social-graph information determined based on the first and second nodes of the social graph of the communication network.

10. The method of claim 8, wherein the one or more entities relevant to the first user are determined based on:
    a user selection,
    one or more social signals associated with the first user,
    the social-graph information associated with the first user, or
    any combination thereof.

11. The method of claim 8, wherein the one or more content frames associated with the entity are generated by the communication network.

12. The method of claim 8, wherein the one or more content frames associated with the entity are generated based on the second node corresponding to the entity.

13. The method of claim 1, wherein the content frames are stationary, moving, or interactive.

14. The method of claim 1, wherein at least a portion of the selected content frame is transparent.

15. One or more computer-readable non-transitory storage media embodying software that is configured, when executed by a processor, to:
    access, from a data store of the communication network, user information associated with a first user of the communication network;
    identify one or more entities associated with the communication network that are relevant to the first user based on the user information;
    identify a particular visual content item associated with the first user;
    retrieve, for each identified entity, one or more content frames associated with the entity, wherein each content frame is configured to be displayed in association with the particular visual content item, and wherein each content frame is a customized overlay frame applicable to the particular visual content item;
    rank the one or more content frames based on the user information; and send, to a client device of the first user, instructions for presenting one or more of the content frames as recommended customized overlay frames for the particular visual content item, wherein the one or more content frames are presented in ranked order, and wherein each content frame is selectable by the first user, and the selected content frame is displayed as a temporary overlay overlapping a non-complete portion of the particular visual content item for a period of time specified by the first user, wherein after the specified period of time the selected content frame is removed from the particular visual content item.

16. A system comprising: one or more processors; and a memory coupled to the processors comprising instructions executable by the processors, the processors configured when executing the instructions to:

access, from a data store of the communication network, user information associated with a first user of the communication network;

identify a particular visual content item associated with the first user;

retrieve, for each identified entity, one or more content frames associated with the entity, wherein each content frame is configured to be displayed in association with the particular visual content item, and wherein each content frame is a customized overlay frame applicable to the particular visual content item;

rank the one or more content frames based on the user information; and send, to a client device of the first user, instructions for presenting one or more of the content frames as recommended customized overlay frames for the particular visual content item, wherein the one or more content frames are presented in ranked order, and wherein each content frame is selectable by the first user, and the selected content frame is displayed as a temporary overlay overlapping a non-complete portion of the particular visual content item for a period of time specified by the first user, wherein after the specified period of time the selected content frame is removed from the particular visual content item.

\* \* \* \* \*